United States Patent [19]
Yamamoto

[11] Patent Number: 5,475,669
[45] Date of Patent: Dec. 12, 1995

[54] INFORMATION REPRODUCING METHOD AND APPARATUS FOR COUNTING THE NUMBER OF ERRORS AND WARNING

[75] Inventor: Masakuni Yamamoto, Yamato, Japan

[73] Assignee: Canon Kabushiki Kaisha, Tokyo, Japan

[21] Appl. No.: 288,218

[22] Filed: Aug. 9, 1994

Related U.S. Application Data

[63] Continuation of Ser. No. 53,813, Apr. 29, 1993, abandoned, which is a continuation of Ser. No. 452,500, Dec. 19, 1989, abandoned.

[30] Foreign Application Priority Data

Dec. 20, 1988 [JP] Japan .................... 63-319445

[51] Int. Cl.⁶ ........................................ G11B 7/00
[52] U.S. Cl. .................... 369/58; 369/32; 369/54
[58] Field of Search .................. 369/47, 48, 54, 369/44.32, 57, 44.26, 32, 58; 360/38.01; 371/29.1

[56] References Cited

U.S. PATENT DOCUMENTS

| | | | |
|---|---|---|---|
| 4,604,748 | 8/1986 | Sato ........................ | 360/38.01 |
| 4,800,550 | 1/1989 | Yamanchi ................. | 369/47 |
| 4,821,254 | 4/1989 | Satoh et al. ............... | 369/54 |
| 4,912,694 | 3/1990 | Yamamoto ................ | 369/59 |
| 4,949,326 | 8/1990 | Takagi et al. ............. | 369/54 |
| 4,958,337 | 9/1990 | Yamanaka et al. ........ | 369/58 |
| 4,977,469 | 12/1990 | Yokozawa ................. | 369/43 |
| 5,047,977 | 9/1991 | Hill et al. .................. | 371/29.1 |

FOREIGN PATENT DOCUMENTS

| | | |
|---|---|---|
| 0281408 | 9/1988 | European Pat. Off. . |
| 62-134737 | 6/1987 | Japan . |

*Primary Examiner*—Georgia Y. Epps
*Assistant Examiner*—Nabil Hindi
*Attorney, Agent, or Firm*—Fitzpatrick, Cella, Harper & Scinto

[57] ABSTRACT

An information reproducing method comprises a reading out step for reading out information added with an error correction code from a recording medium, a correcting step for correcting errors of the information read out, and a generating step for generating a warning when the number of errors of the readout information lies within a correctable range and is a predetermined value or more.

12 Claims, 2 Drawing Sheets

INFORMATION REPRODUCING METHOD AND APPARATUS FOR COUNTING THE NUMBER OF ERRORS AND WARNING

This application is a continuation of application Ser. No. 08/053,813 filed Apr. 29, 1993 now abandoned which is a continuation of application Ser. No. 07/452,500 filed on Dec. 19, 1989 now abandoned.

BACKGROUND OF THE INVENTION

1. Field of the Invention

The present invention relates to method and apparatus for reproducing information added with an error correction code from a recording medium.

2. Related Background Art

In recent years, with the development of the information society, a number of recording media are used. In association with it, a management system to maintain the reliability of the information recording media has also become important. Disk-shaped media and card-shaped media such as magnetic recording medium, optical recording medium, and the like have been known as information recording media. However, in such media, reading errors occur because of physical scratches of the medium itself, dust deposited on the surface of the medium upon reading thereof, or a certain kind of time-dependent change due to an environmental factor. Among the errors, those causes are serious and there is also an error (burst error) such that an error is always generated irrespective of timing and the error cannot be corrected even if the error correction is executed by using an error correction code. However, in the case where the causes of the errors are relatively insignificant, for instance, a reading error which is generated due to a small scratch or dust or a reading error (byte error) which is generated due to a time-dependent change which gradually progresses becomes an error or does not become an error in dependence on the reading timing.

Ordinarily, in the information reproducing apparatus, upon reading, the error correction code is read out together with the information and the error correction is executed. When the degree of error exceeds the error correcting capability, the reading operation is retried. Although it is better if the information can be accurately reproduced by repeating the retry of the error correction a number of times, if the error correction cannot be executed, the information cannot be reproduced.

The case where the information which was initially set at the correctable level becomes unreproducible because errors gradually increase and cause a problem. In this case, if the information is not backed up, it will be permanently lost. Moreover, since the error correction is automatically executed in the reproducing apparatus, the user cannot sense such an increase in errors at all.

SUMMARY OF THE INVENTION

It is an object of the present invention to provide information reproducing method and apparatus which can prevent that the reproduction of information becomes impossible for a period of time when the user is not aware of such an unreproducible state and in which the user can know the time to back up the information.

The above object of the invention is accomplished by an information reproducing method, comprising the steps of: reading out information added with an error correction code from a recording medium; correcting errors of the information read out; and generating a warning signal when the number of errors of the readout information lies within a correctable range and is a predetermined value or more.

On the other hand, an information reproducing apparatus for embodying the above method comprises: means for reading information added with an error correction code from a recording medium; means for correcting errors of the information read out; means for counting the number of errors of the readout information; and means for generating a warning signal when a count value of the counting means lies within a range in which the errors can be corrected by the error correcting means and is a predetermined value or more.

DETAILED DESCRIPTION OF THE PREFERRED EMBODIMENTS

Figure 1:
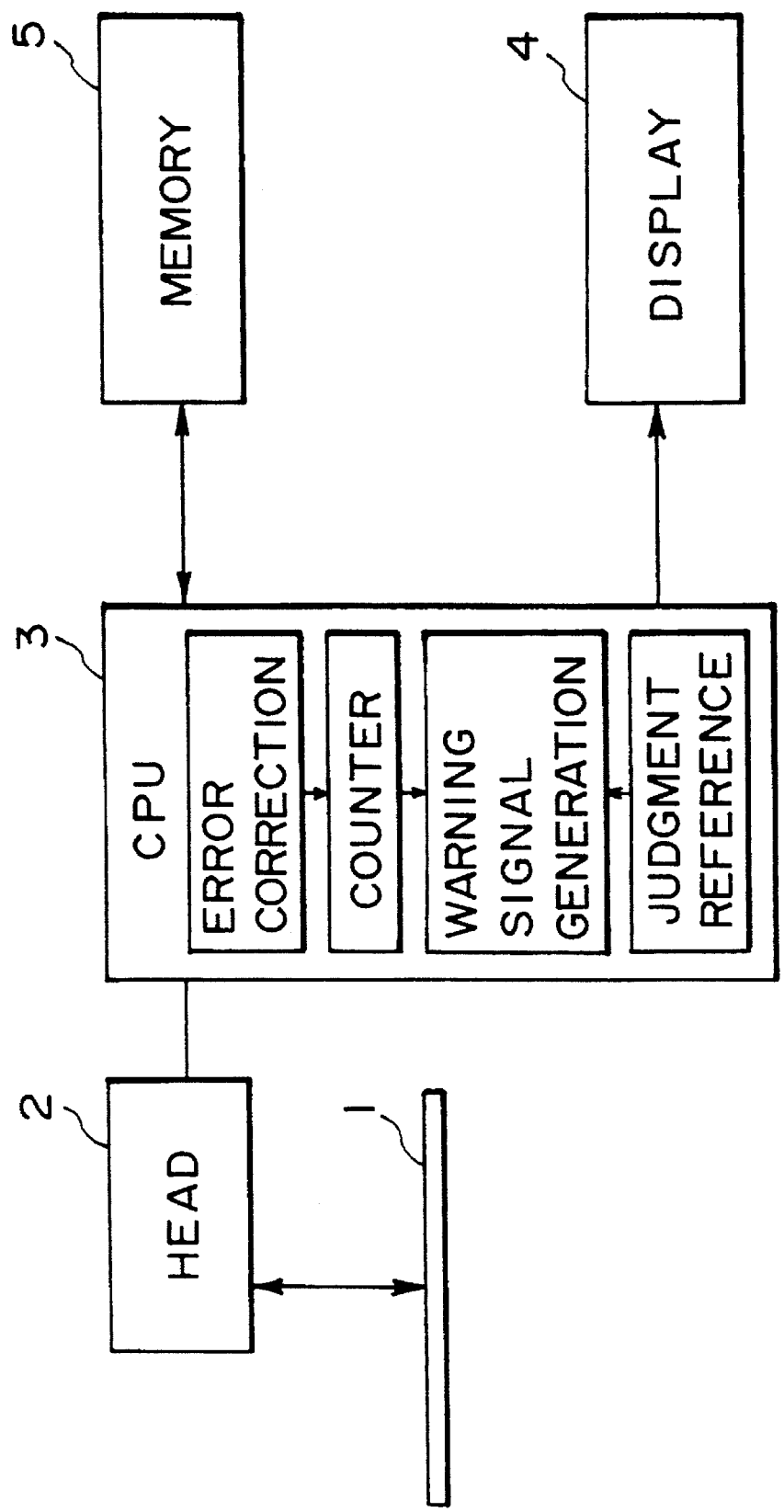
FIG. 1 is a schematic diagram for explaining an embodiment of an information reproducing apparatus of the invention.

FIG. 1 is a schematic diagram showing an embodiment of an information reproducing apparatus of the invention. In FIG. 1, reference numeral 1 denotes, for instance, an optical card serving as an optical information recording medium. When the optical card 1 is located at the set position, information recorded on the optical card 1 is read out by an optical head 2. The photosignal indicative of the read information is converted into an electric signal by the optical head 2 and, thereafter, the electric signal is input to a central processing unit (CPU) 3. The CPU 3 outputs the reproduced information to a peripheral device 4 such as printer, display, or the like.

When information is recorded onto the optical card 1, an error correction code is added to the information. The optical head 2 reads out the error correction code together with the information. If reading errors exist, the error correction is executed by using the error correction code by an error correcting circuit provided in the CPU 3. On the other hand, if the reading errors cannot be corrected because they exceed the error correcting capability of the error correcting circuit, the CPU 3 instructs the optical head 2 to again read out the same information and repeats the reading operation until the accurate information is reproduced. In this case, the CPU 3 counts the number n of reading times. If the number n of reading times exceeds a predetermined number M, the CPU 3 determines that the reproduction of the information is impossible and informs the user of such a situation.

On the other hand, if the degree of the reading errors lies within a correctable range, the CPU 3 clears a buffer or a memory 5 so as to reset the number n of reading times to 0 and also outputs the error corrected information to the peripheral device 4. At this time, the CPU 3 also informs the user of the fact that there is a possibility such that the reproduction of the information is becoming impossible through the peripheral device 4 such as a display or the like as is necessary on the basis of the degree of error correction.

Such a degree of error correction will now be practically explained hereinbelow. For instance, it is assumed that one unit of read information comprises n×m bytes and an error correction code comprising n' bytes in the lateral direction and m' bytes in the vertical direction is added to the matrix of those bytes. In the case where the information with such an error correction code has been written as one-dimensional or two-dimensional binary data to the optical card, the error correcting capability of the information is determined by the size of n×m bytes or the size of n'×m' bytes which are added. If reading errors exist, flags are set upon error correction. The number of flags is counted as a degree k of correction by a counter in the CPU 3. For instance, when assuming that the error correcting capability is set to one byte in the lateral direction and to two bytes in the vertical direction in the above example, in the case of six bytes or more, there occurs a situation such that the errors cannot be corrected. In such a case, k=6 is counted and the CPU 3 instructs to again read out the information as mentioned above.

On the other hand, if k<6, the accurate information can be reproduced by executing the error correction. However, as the correction degree k increases, a probability such that the reproduction of the information will become impossible later rises. Therefore, by presetting a judgment reference T by considering to which degree the quality of the information recorded on the medium is permitted, it is possible to inform the user of the fact that the quality of the recording medium has reached the state which is improper to use. For example, it is sufficient to construct in a manner such that the judgment reference T is set in a setting circuit in the CPU 3 the judgment reference T is compared with the count value k of the counter and a warning signal is generated when k≧T is provided in the CPU 3. The peripheral device 4 receives the warning signal and displays or prints out warning information, thereby warning to the user.

Figure 2:
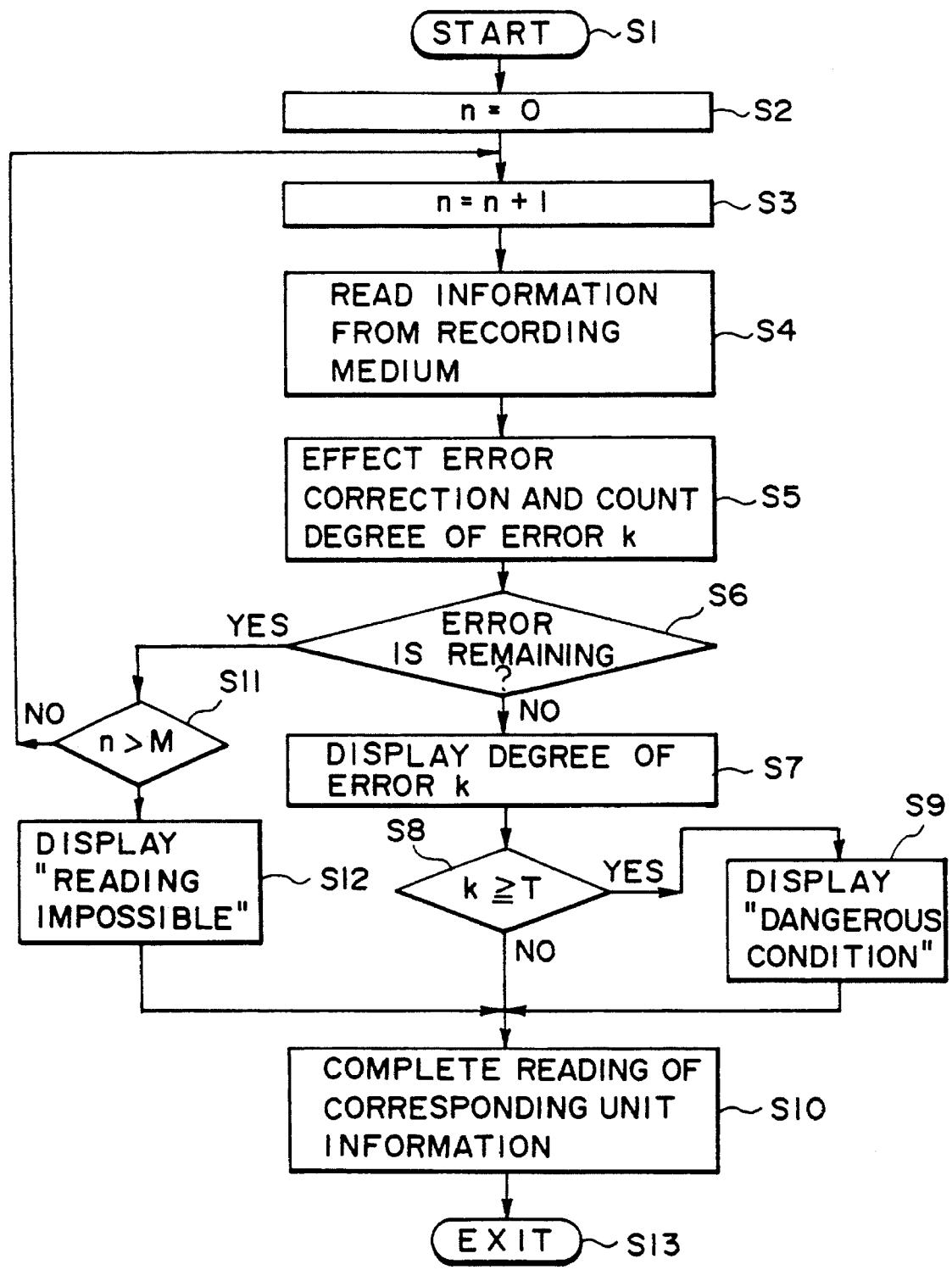
FIG. 2 is a flowchart for explaining an embodiment of an information reproducing method of the invention.

FIG. 2 is a flowchart for explaining an embodiment of an information reproducing method of the invention using the apparatus as shown in FIG. 1. In FIG. 2, in step S1, a reading program with respect to one information unit is first started. In the next step S2, the number n of reading times is initialized. In step S3, the number n of reading times is counted up by +1 at a time (n=n+1). In step S4, the unit information regarding a predetermined address is read out of the recording medium (for instance, the optical card 1), the error correction code added to the unit information is read out, and a check is made to see if errors exist or not. For instance, as mentioned in the above example, with respect to n×m bytes, if the error correction information is set to n' and m', the CPU 3 executes the arithmetic operations with respect to the lateral and vertical directions, respectively. Thus, in step S5, the reading errors of the unit information are corrected and the correction degree k of the error is counted. In step S6, a check is made to see if the errors exceed the limit of the error correcting capability and the errors remain as output information or not. If some errors remain, the processing routine advances to step S11 to again read out the information. However, if no error remains, step S7 follows and the degree k of the errors at that time is displayed by using, e.g., a display or the like, thereby allowing the user to know it. On the other hand, in the next step S8, the CPU 3 discriminates whether the error degree k exceeds a set value T or not. If YES, step S9 follows and the message of "dangerous condition" is displayed by using the display or the like, thereby allowing the user to recognize the dangerous state about the quality of the recording medium. In any of the cases of the above steps, the reading of the corresponding unit information is completed in step S10 and the processing routine is finished (step S13).

In step S11, the number n of reading times is compared with a preset value M in the CPU 3 and unless n>M, the processing routine is returned to step S3 in order to retry the reading. After the number n of reading times has been counted up, the processing routine again advances to step S4 and subsequent steps. On the contrary, if n>M in step S11, step S12 follows and the message of "reading impossible" is displayed by using the display or the like, thereby allowing the user to recognize that the relevant unit information on the recording medium cannot be read. The processing routine is finished (step S13) in the erroneous reading state.

In the above embodiment, even for the number M' of retries (M'<M), the processing routine may advance to step S9 to inform the reliability of the relevant unit information, that is, the dangerous condition may be also displayed.

As described above, according to the information reproducing method of the invention, even when the error correction can be executed at the present time, if there is a possibility such that the error correction will be impossible upon next reading, a warning signal is generated, thereby instructing the necessity of the backup of the information to the user, so that the loss of information can be prevented.

The present invention is not limited to only the above-described embodiments but other various applications are possible. For instance, the recording medium is not limited to the optical card but magnetic recording medium and optical recording medium in various types such as disk-shaped medium, tape-shaped medium, and the like can be also used. The invention incorporates all of the above applications without departing from the spirit and scope of the appended claims of the invention.

What is claimed is:

1. An information reproducing method comprising the steps of:

reading out information with an added error correction code from a recording medium;

correcting errors of the information read out using the error correction code;

counting the number of errors of the readout information;

determining whether errors remain in the output information after said correction or not;

reading out the information again from the recording medium when it is determined that the errors remain;

comparing the counted number of errors with a predetermined reference value when it is determined that no error remains;

producing a warning signal when the counted number of errors exceeds said predetermined reference value; and displaying a warning on reproducing information in display means in accordance with said warning signal.

2. A method according to claim 1, further comprising the step of stopping the reading out again of the information when the number of reading out again times exceeds a predetermined value and displaying that the reproduction is impossible.

3. A method according to claim 1, further comprising the step of displaying the number of errors of the readout information.

4. An information reproducing apparatus comprising:

means for reading out information with an added error correction code from a recording medium;

correcting means for correcting errors of the readout information using the error correction code;

means for counting errors in the readout information;

means for determining whether errors remain in the output information after said correction or not;

control means for controlling said reading out means so as to read the information again from the recording medium when the errors remain;

means for comparing the number of counted errors with a predetermined reference value when no error remains;

means for producing a warning signal when the number of the counted errors exceeds said predetermined reference value; and display means for receiving said warning signal and for displaying a warning on reproducing information.

5. An apparatus according to claim 4, wherein said reading means comprises an optical head.

6. An apparatus according to claim 4, wherein said error correcting means, said counting means, said determining means, said control means and said warning signal producing means are provided in a central processing unit.

7. An information reproducing method comprising the steps of:

reading out information with an added error correction code from a recording medium;

correcting errors in the readout information using the error correction code;

counting errors of the readout information;

comparing the number of counted errors with a predetermined reference value, the predetermined reference value being smaller than a correctable range of the error correction code;

producing a signal representing that future correction by said error correction code is improbable when the number of counted errors falls within a correctable range of the error correction code but exceeds the predetermined reference value; and displaying a warning on reproducing information in display means in accordance with said representing signal.

8. An information reproducing apparatus comprising:

means for reading out information with an added error correction code from a recording medium;

correcting means for correcting errors in the readout information using the error correction code;

means for counting errors in the readout information;

means for comparing the number of counted errors with a predetermined reference value, the predetermined reference value being smaller than a correctable range of the error correction code;

means for producing a signal representing that future correction by said error correction code is improbable when the number of counted errors falls within a correctable range of said error correction code but exceeds the predetermined reference value; and display means for receiving said representing signal and for displaying a warning on reproducing information.

9. An information reproducing method comprising the steps of:

reading out information with an added error correction code from a recording medium;

correcting errors in the readout information using the error correction code;

determining whether errors remain in the output information after said correction or not;

retrying the reading out operation for reading out the information again from the recording medium when it is determined that the errors remain;

counting retrying operations;

producing a warning signal when the number of the counted retrying operations reaches a predetermined value; and displaying a warning on reproducing information in display means in accordance with said warning signal.

10. An information reproducing apparatus comprising:

means for reading out information with an added error correction code from a recording medium;

correcting means for correcting errors in the readout information using the error correction code;

means for determining whether errors remain in the output information after said correction or not;

control means for controlling said reading out means so as to retry the reading out operation for reading out the information again from the recording medium when the errors remain;

means for counting retrying operations;

means for producing a warning signal when the number of the counted retrying operations reaches a predetermined value; and display means for receiving said warning signal and for displaying a warning on reproducing information.

11. An information reproducing method comprising the steps of:

reading out information with an added error correction code from a recording medium;

correcting errors in the readout information using the error correction code;

determining whether errors remain in the readout information after said correction or not;

retrying the reading out step for reading out the information again from the recording medium when it is determined that the errors remain in the readout information;

when remaining errors are absent in the readout information as a result of the retrying step, comparing the number of retrying steps performed until the remaining errors are absent with a predetermined reference value;

producing a warning signal when the number of retrying steps exceeds said predetermined reference value; and displaying a warning on reproducing information in a display means in accordance with said warning signal.

12. An information reproducing apparatus comprising:

means for reading out information with an added error correction code from a recording medium;

correcting means for correcting errors of the readout information using the error correction code;

means for determining whether errors remain in the readout information after said correction or not;

control means for controlling said reading out means so as to retry reading out the information again from the recording medium when the errors remain;

means responsive to absence of remaining errors in the readout information resulting from the reading out retry of the control means for comparing the number of reading out retries with a predetermined reference value;

means for producing a warning signal when the number of reading out retries exceeds said predetermined reference value; and display means for receiving said warning signal and for displaying a warning on reproducing information.

* * * * *

UNITED STATES PATENT AND TRADEMARK OFFICE
CERTIFICATE OF CORRECTION

PATENT NO. : 5,475,669
DATED : December 12, 1995
INVENTOR(S) : MASAKUNI YAMAMOTO It is certified that error appears in the above-indentified patent and that said Letters Patent is hereby corrected as shown below: On the title page, Item

[56 References Cited]

"Yamanchi" should read --Yamauchi--.

COLUMN 3

Line 24 "CPU 3" should read --CPU 3,--.

COLUMN 6

Line 44 "comprising;" should read --comprising:--.

Signed and Sealed this

Sixteenth Day of April, 1996

Attest:

BRUCE LEHMAN

Attesting Officer        Commissioner of Patents and Trademarks